United States Patent [19]
Hulin

[11] 3,805,628
[45] Apr. 23, 1974

[54] TRANSMISSIONS
[75] Inventor: James Alan Hulin, Tamarisk, England
[73] Assignee: Beasley French & Company Limited, Bristol, England
[22] Filed: Oct. 2, 1972
[21] Appl. No.: 294,190

[52] U.S. Cl. ................................. 74/69
[51] Int. Cl. ........................... F16h 21/14
[58] Field of Search ........................... 74/69

[56] References Cited
UNITED STATES PATENTS
| | | | |
|---|---|---|---|
| 2,741,169 | 4/1956 | Weiss | 74/69 |
| 2,971,489 | 2/1961 | Loser, Jr. | 74/69 |
| 3,286,536 | 11/1966 | Hallmann | 74/69 |
| 3,530,731 | 9/1970 | Koch et al. | 74/69 |

Primary Examiner—Samuel Scott
Assistant Examiner—Wesley S. Ratliff, Jr.
Attorney, Agent, or Firm—Lackenbach & Lackenbach

[57] ABSTRACT

A slider crank type of cyclic transmission comprises a radially slotted member on one shaft and a crank member on the other shaft which slidably engages in the slot. The axes of the two shafts are generally parallel but not coaxial. To allow some degree of relative angular movement of the shafts out of a parallel relationship, the slot is deep enough to allow axial movement of the crank member within it, and the crank member is pivoted to said other shaft through an axis extending generally longitudinally of the slot.

3 Claims, 2 Drawing Figures

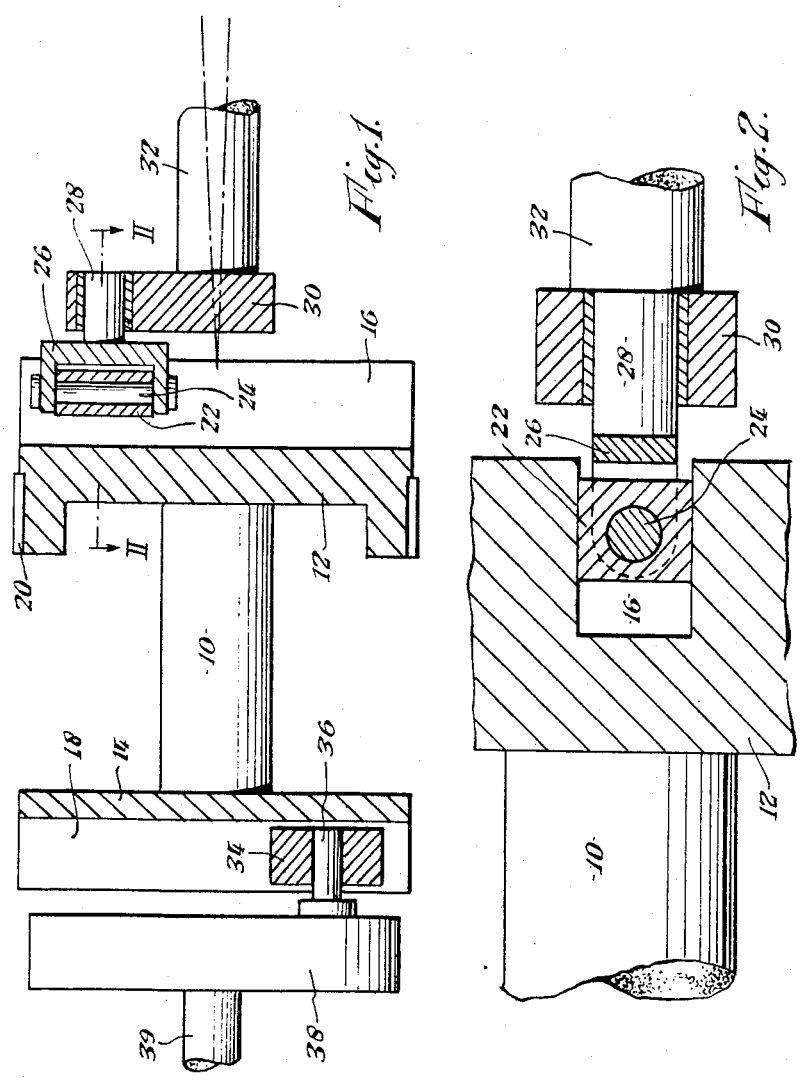

TRANSMISSIONS

This invention relates to mechanical transmissions, and more particularly to slider crank mechanisms for transmitting a cyclicly varying drive between two relatively offset axes.

In machinery for cutting a continuously moving web at intervals along its length in a direction generally transverse to the direction of travel, for example in envelope making machines, it is usual to mount a cutting knife on a transversely extending rotor, the rotor being driven so that during the period of contact between the blade and the web the two are travelling in the same direction and as nearly as possible the same speed. Although the axis of rotation is generally at right angles to the direction of travel of the web, it is sometimes advantageous to be able to vary the position of the axis a few degrees either way. This should be done without having to alter the overall relative position of the web driving machinery and the cutter driving machinery. In a recent development with which the present inventor has been associated, the driving mechanism for the cutter has involved the use of a cyclic transmission including a slider crank mechanism. For this and other uses the present invention seeks to provide a slider crank transmission which allows an angular displacement between the input and output shafts.

According to the present invention there is provided a slider crank transmission comprising a pair of rotatable shafts, a member carried by one of the shafts and having a radially extending slot, and a crank member which is slidable in the slot and is pivotally connected to the other shaft about a first axis which is eccentric of and parallel to that of said other shaft and about a second axis which is substantially radial to the axis of said other shaft, the slot being sufficiently deep to permit angular movement of the crank member in the slot about an axis which extends at right angles to the longitudinal direction of the slot and at right angles to the axis of said one shaft.

Preferably, one of the two shafts drives a counter-balance through a second slider crank mechanism which is arranged to be out of phase with the first slider crank mechanism so that variations in the angular velocity of said second shaft may be balanced by opposite variations in the angular velocity of the counter-balance. The second slider crank mechanism may comprise a second crank member slidable in said slot and pivotally connected to the counter-balance about an axis eccentric of and parallel to the axis of rotation of the counter-balance. Alternatively, a further slotted member may be provided to operate the second slider crank mechanism.

In order that the invention may be more clearly understood, one embodiment will now be described with reference to the accompanying drawing wherein:

FIG. 1 shows a cross-sectional side view of the transmission, and

FIG. 2 shows a section on the line II—II of FIG. 1.

Referring to the drawing, the input shaft 10 is suitably journalled to a support (not shown) intermediate its ends, and carries at its ends discs 12 and 14 respectively. Each disc has a diametrically extending slot 16, 18 respectively in its face remote from the shaft 10. The disc 12 carries an outwardly toothed gear ring 20 by means of which the shaft 10 is driven.

Slidable in the slot 16 is a parallel sided block 22 which is pivotally mounted to a pin 24 extending longitudinally of the channel. At its ends the pin 24 is carried by the arms of a U-shaped bracket 26. From the centre of the bracket extends an axle 28 which is journalled to a crank 30 at one end of the output shaft 32.

In the slot 18 is slidable a block 34 which is pivotally mounted through a pin 36 to a counter-balance wheel 38 eccentrically of the axis of the wheel.

In operation, the input shaft 10 is driven by a suitable source, and this in turn drives the output shaft 32 and the counter-balance wheel 38 by means of the slider crank mechanisms. A cyclic variation is introduced into the angular velocity of the output shaft and balance wheel by offsetting the axis of rotation of the shaft 10 relative to the axis of rotation of the output shaft and balance wheel. The crank of the counter-balance wheel is arranged to be diametrically opposite that of the output shaft and the axis of the counter-balance wheel is similarly offset with respect to the shaft 10 so that its variations in angular velocity are 180° out of phase with those of the output shaft. The balance wheel is designed to provide a load similar to that applied to the output shaft so that the load on the shaft 10 is kept near constant as possible. The wheel 38 may if necessary be connected through a shaft 39 to a further load to assist in balancing.

The axis of rotation of the output shaft 32 can be varied a few degrees out of parallel with the axis of rotation of the shaft 10. This angular variation can be resolved into two components, one a pivotal movement about the axis of the pin 24, and the other a pivotal movement about an axis (shown at 40 in FIG. 2) at right angles to the axis of the pin 24 and at right angles to the axis of rotation of the shaft 32. The former pivotal movement is allowed for by rotation of the block 22 about the pin 24. The latter angular movement is allowed for by the excess depth of the slot 16.

I claim:

1. A slider crank transmission comprising a pair of rotatable shafts, a member carried by one of the shafts and having a radially extending slot, a crank member slidable in the slot and means connecting said crank member with the other shaft for pivotal movement relative thereto about a first axis which is eccentric of and parallel to that of said other shaft and about a second axis which is substantially radial to the axis of said other shaft, the slot being sufficiently deep to permit angular movement of the crank member in the slot about an axis which extends at right angles to the longitudinal direction of the slot and at right angles to the axis of said one shaft.

2. A slider crank transmission according to claim 1 wherein one of the two shafts drives a counter-balance through a second slider crank mechanism which is arranged to be out of phase with the first slider crank mechanism so that variations in the angular velocity of said other shaft may be balanced by opposite variations in the angular velocity of the counter-balance.

3. A slider crank transmission according to claim 2 wherein the second slider crank mechanism comprises means for defining a further radial extending slot portion having an axis aligned with said first mentioned slot a second crank member slidable in said further slot portion generally radially oppositely said first mentioned crank member connected with the counter-balance for pivotal movement relative thereto about an axis eccentric of and parallel to the axis of rotation of the counter-balance.

* * * * *